United States Patent
Okuda et al.

(10) Patent No.: US 8,087,791 B2
(45) Date of Patent: Jan. 3, 2012

(54) METHODS AND SYSTEMS FOR ADJUSTING THE POSITION OF VEHICLE OUTSIDE MIRRORS

(75) Inventors: Masato Okuda, Novi, MI (US); Norm Kerr, Ann Arbor, MI (US)

(73) Assignee: Toyota Motor Engineering and Manufacturing North America, Inc., Erlanger, KY (US)

( * ) Notice: Subject to any disclaimer, the term of this patent is extended or adjusted under 35 U.S.C. 154(b) by 464 days.

(21) Appl. No.: 12/424,292

(22) Filed: Apr. 15, 2009

(65) Prior Publication Data

US 2010/0265600 A1 Oct. 21, 2010

(51) Int. Cl.
*G02B 5/08* (2006.01)

(52) U.S. Cl. ...................................... 359/843

(58) Field of Classification Search .......... 359/841, 359/843, 872, 877
See application file for complete search history.

(56) References Cited

U.S. PATENT DOCUMENTS

| 4,811,226 | A | 3/1989 | Shinohara |
|---|---|---|---|
| 5,668,675 | A | 9/1997 | Fredricks |
| 5,694,259 | A | 12/1997 | Brandin |
| 5,798,575 | A | 8/1998 | O'Farrell et al. |
| 5,993,015 | A | 11/1999 | Fredricks |
| 6,154,328 | A * | 11/2000 | Welsch et al. ................. 359/872 |
| 6,176,587 | B1 | 1/2001 | Fredricks |
| 6,397,137 | B1 | 5/2002 | Alpert et al. |
| 6,501,536 | B1 | 12/2002 | Fredricks |
| 6,621,062 | B1 | 9/2003 | Tamagawa et al. |
| 7,373,249 | B2 | 5/2008 | Ivanov |
| 2005/0017842 | A1 | 1/2005 | Dematteo |
| 2006/0167606 | A1 | 7/2006 | Malhas |
| 2006/0178787 | A1 | 8/2006 | McCall |

* cited by examiner

*Primary Examiner* — Euncha Cherry
(74) *Attorney, Agent, or Firm* — Dinsmore & Shohl LLP (57) ABSTRACT

A method for adjusting an outside mirror of a vehicle includes providing at least one seat position sensor, a driver position detector and a mirror actuator. The position of the driver's seat is determined with the at least one seat position sensor. An angular orientation of the outside mirror is adjusted with the mirror actuator based on the determined position of the driver's seat such that a rear of the vehicle is visible in the outside mirror. Thereafter, a location of a driver's head may be determined with the driver position detector when the driver is seated in the driver's seat. The angular orientation of the outside mirror is readjusted with the mirror actuator based on the detected position of the driver's head such that a rear of the vehicle is visible in the outside mirror when the driver is seated in the driver's seat.

20 Claims, 11 Drawing Sheets

METHODS AND SYSTEMS FOR ADJUSTING THE POSITION OF VEHICLE OUTSIDE MIRRORS

TECHNICAL FIELD

The present invention generally relates to rearview mirrors for vehicles and, more specifically, to methods and systems for adjusting the position of outside mirrors.

BACKGROUND

Vehicles typically include at least one outside mirror which enables the driver to see along the side of the vehicle towards the rear of the vehicle thereby permitting the driver to see obstacles to the rear and side of the vehicle when reversing. The outside mirror also enables the driver to see traffic approaching from the rear of the vehicle when maneuvering, such as when the driver changes lanes and the like. In addition to permitting the driver to view both obstacles and oncoming traffic, the outside rear view mirror, when properly adjusted, may also give the driver a frame of reference with respect to the rear of the vehicle. This occurs when the outside mirror is adjusted such that the rear of the vehicle is visible in at least a portion of the surface of the mirror.

Properly orienting the mirror to maximize the rearward field of view while establishing a rearward frame of reference with respect to the rear of the vehicle may be easily accomplished with outside mirrors having convex glass surfaces. However, Federal Motor Vehicle Safety Standards require that the left hand or driver's side outside mirror contain a flat glass. The use of a flat glass may make properly adjusting the mirror to maximize the rearward field of view while establishing a frame of reference with respect to the rear of the vehicle challenging for some drivers. Often times the driver's side outside mirror is adjusted too far inward (towards the vehicle) which, in turn, causes too much of the driven vehicle to appear in the mirror and too little of the adjacent lane and/or passing vehicles. This mirror adjustment results in blind spots outboard of the vehicle and, as such, does not provide the driver with sufficient information about vehicles in the adjacent lane before making lane change maneuvers.

Accordingly, a need exists for alternative methods for adjusting the outside mirrors of vehicles to maximize field of view and provide a frame of reference for the driver with respect to the rear of the vehicle.

SUMMARY

In one embodiment, a method for adjusting an outside mirror of a vehicle may include providing at least one seat position sensor, a driver position detector and a mirror actuator. The position of the driver's seat may be determined with the at least one seat position sensor. Thereafter, the angular orientation of the outside mirror may be adjusted with the mirror actuator based on the determined position of the driver's seat such that blind spots in the mirror are minimized. The location of a driver's head may then be detected with the driver position detector when the driver is seated in the driver's seat. The angular orientation of the outside mirror may then be readjusted with the mirror actuator based on the detected position of the driver's head such that blind spots in the mirror are minimized when the driver is seated in the driver's seat.

In one embodiment, a method for adjusting an outside mirror of a vehicle may include providing at least one seat position sensor, a driver position detector and a mirror actuator. The position of the driver's seat may be determined with the at least one seat position sensor. Thereafter, the angular orientation of the outside mirror may be adjusted with the mirror actuator based on the determined position of the driver's seat such that blind spots in the mirror are minimized when a driver is seated in the driver's seat. The location of a driver's head may then be detected with the driver position detector when the driver is seated in the driver's seat. The angular orientation of the outside mirror may then be readjusted with the mirror actuator based on the detected position of the driver's head such that blind spots in the mirror are minimized when the driver is seated in the driver's seat. The outside mirror may be rotated away from the vehicle when a turn signal of the vehicle is actuated while the outside mirror may be rotated towards the vehicle and downwards when the vehicle is reversing.

In yet another embodiment, a system for adjusting a position of an outside mirror of a vehicle may include an electronic control unit operatively coupled to a mirror actuator, at least one seat position sensor operatively coupled to a driver's seat and the electronic control unit, a driver position detector operatively coupled to the electronic control unit and a mirror actuator mechanically coupled to the outside mirror and the electronic control unit. The at least one seat position sensor may be operable to send a first electronic signal to the electronic control unit indicative of a position of the driver's seat at vehicle start-up. The electronic control unit may be programmed to receive the first electronic signal indicative of the position of the driver's seat at vehicle start-up and adjust an angular orientation of the outside mirror based on the received first electronic signal by sending a first control signal to the mirror actuator. The first control signal sent to the mirror actuator positions the mirror such that blind spots in the mirror are minimized. The driver position detector may be operable to detect a location of the driver's head while the vehicle is in drive and send a second electronic signal to the electronic control unit indicative of the detected location of the driver's head. The electronic control unit may be further programmed to receive the second electronic signal indicative of the location of the driver's head and readjust the angular orientation of the outside mirror based on the received second electronic signal by sending a second control signal to the mirror actuator, wherein the second control signal sent to the mirror actuator positions the mirror such that blind spots in the mirror are minimized.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 3:
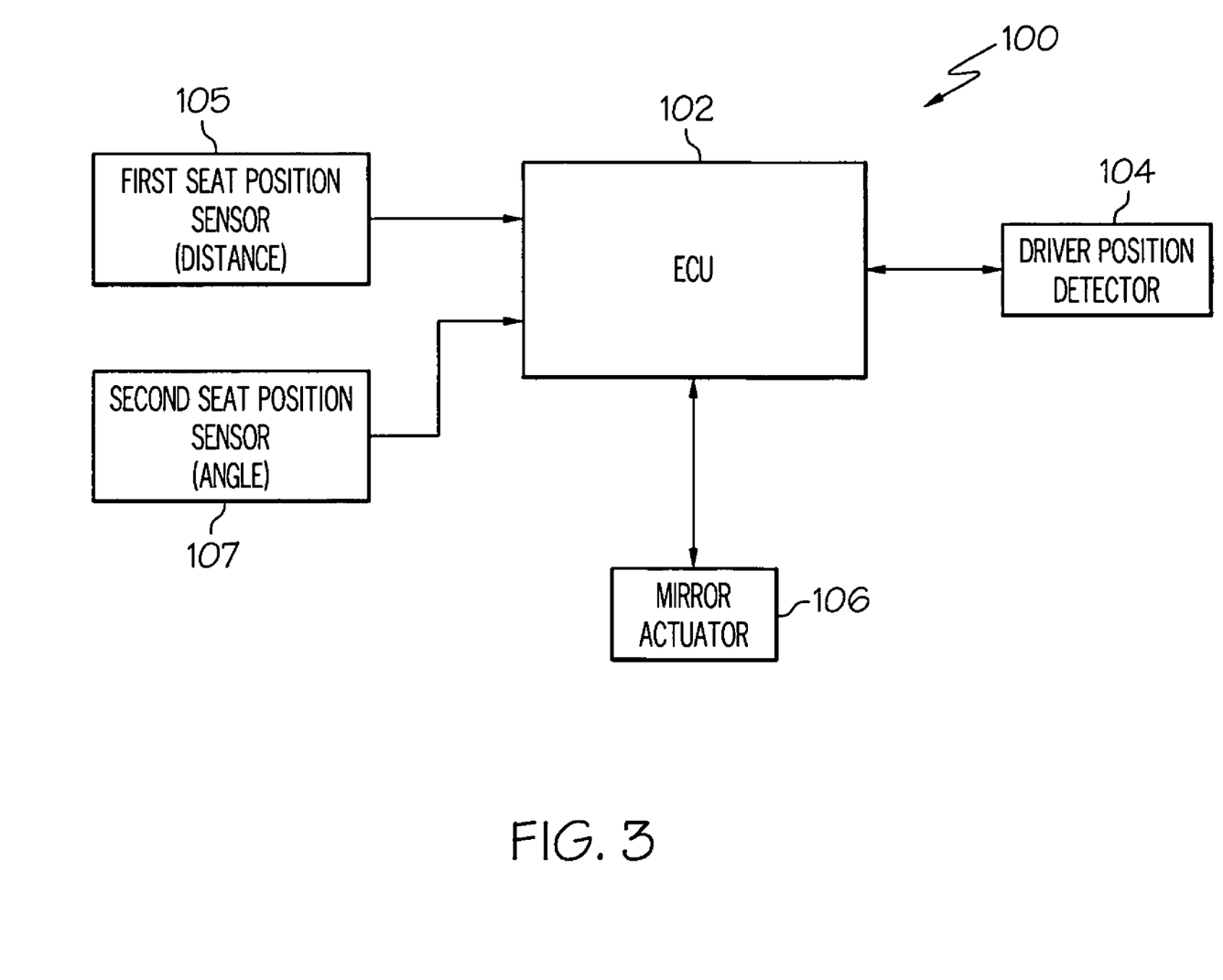
FIG. 3 generally depicts a block diagram of a system for adjusting the position of a vehicle outside mirror according to one or more embodiments shown and described herein.

FIG. 3 generally depicts a system for adjusting the position of an outside mirror of a vehicle based on the position of a driver in the driver's seat in order to reduce blind spots, establish a frame of reference for the driver with respect to the rear of the vehicle and maximize the driver's rearward field of view. The system may generally comprise an electronic control unit, a driver position detector, at least one seat position sensor and a mirror actuator. Various embodiments of the system for adjusting the position of an outside mirror of a vehicle and methods for using the system will be described in more detail herein.

Reference will be made herein to reducing, eliminating, minimizing and/or mitigating blind spots by adjusting the outside mirrors of the vehicle. It will be understood that the terms "reducing," "eliminating," "minimizing" and/or "mitigating" blind spots, or similar terms, refer to adjusting the angular orientation of the outside mirrors of the vehicle such that the driver's rearward field of view is maximized while establishing a rearward frame of reference for the driver with respect to the rear of the vehicle.

Figure 1A:
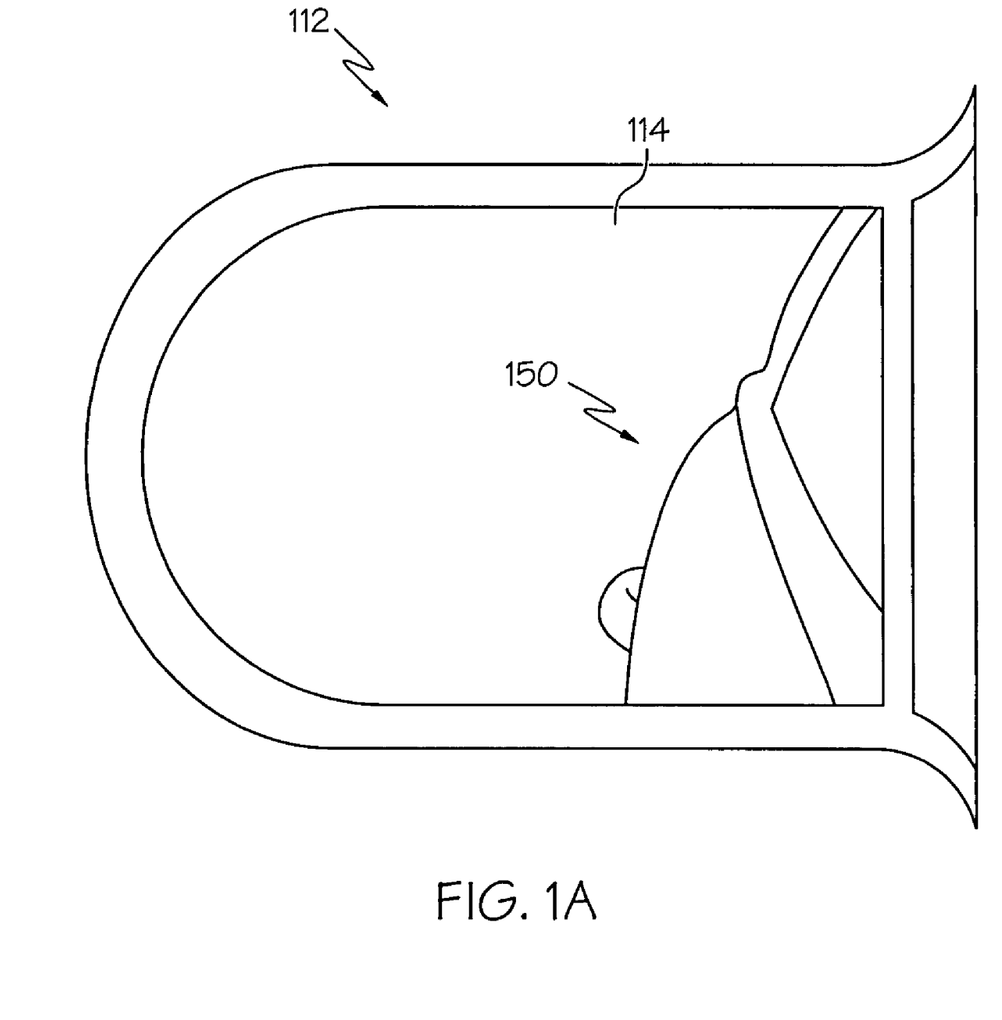
FIGS. 1A and 1B depict an outside vehicle mirror in un-optimized and optimized positions, respectively.
Figure 1B:
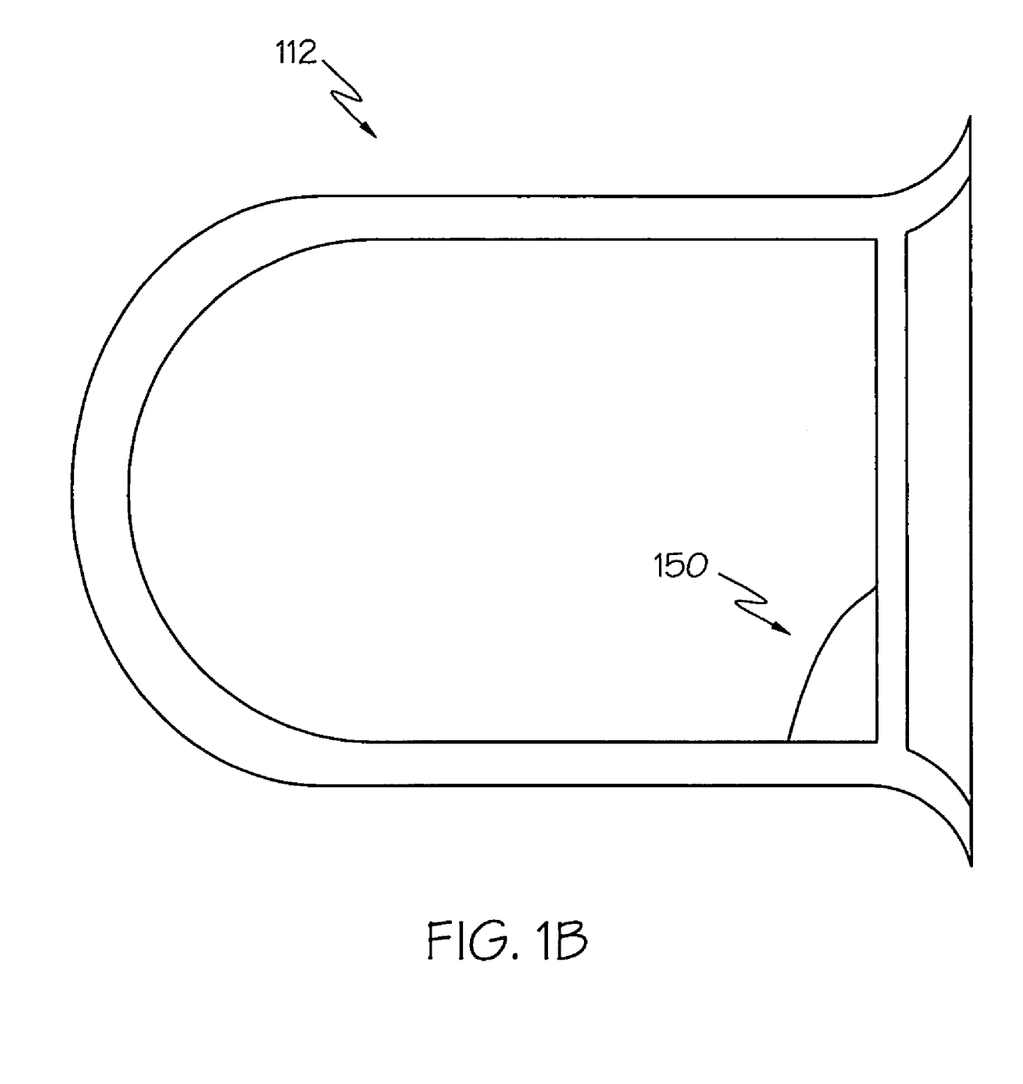
Figure 2:
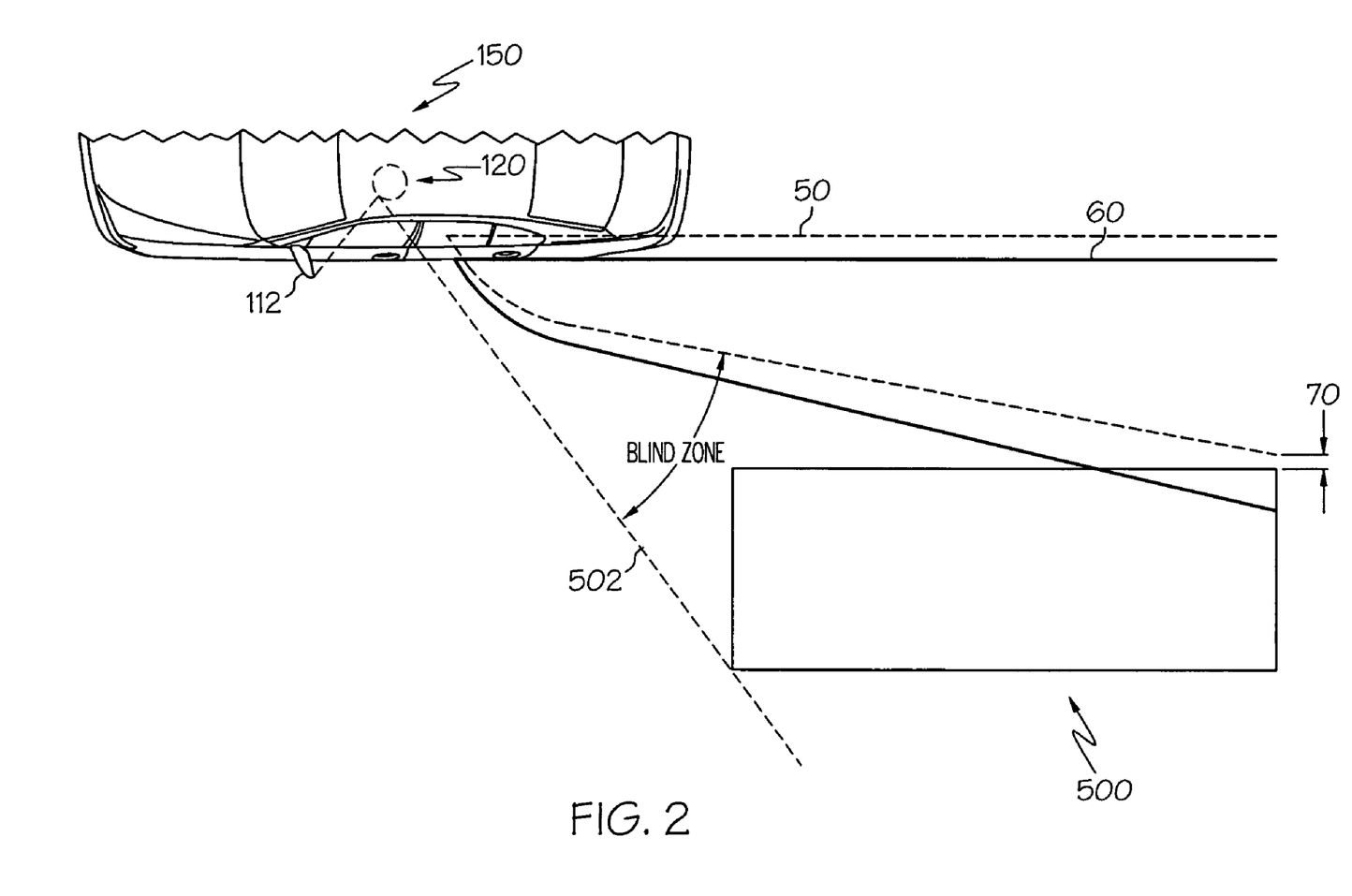
FIG. 2 graphically illustrates the rearward field of view of an optimized mirror (solid lines) and an un-optimized mirror (dashed lines)

Referring now to FIGS. 1A-1B and 2, an outside mirror 112 of a vehicle 150 is depicted in un-optimized (FIG. 1A) and optimized (FIG. 1B) while the corresponding rearward fields of view are depicted in FIG. 2. When the mirror is in an un-optimized position, as depicted in FIG. 1A, the mirror 112 is rotated too far inward (e.g., towards the vehicle). Accordingly, much of the mirror surface is obscured by the reflection of the vehicle 150 in the outside mirror 112 and the amount of the mirror surface area for viewing objects to the rear of the vehicle is reduced. Further, as shown in FIG. 2, the rearward field of view 50 of the un-optimized mirror is directly to the rear of the vehicle thus creating a blind spot 70 in areas to the rear and adjacent to the vehicle. For example, referring to FIG. 2, an object vehicle 500 positioned to the rear and adjacent to the vehicle 150 may not be visible in the rearward field of view 50 of the un-optimized mirror. In addition, the line 502 graphically depicts the limit of the driver's 120 peripheral vision when looking in the outside mirror 112. As shown in FIG. 2, the area between the line 502 and the rearward field of view 50 of the outside mirror 112 in the un-optimized position is a blind zone and any objects located in this zone the driver 120 is not able to see either peripherally or in the outside mirror 112.

In contrast, FIG. 1B shows the outside vehicle mirror 112 in an optimized position. In this position the mirror is rotated outward (e.g., away from the vehicle) such that the amount of the vehicle 150 visible in the mirror is minimized while still providing a driver with a frame of reference with respect to the vehicle. For example, in one embodiment, a rearward frame of reference may be established by adjusting the outside rearview mirror such that at least a portion of the vehicle 150 is visible in less than about 10% of the outside rearview mirror thus providing the remaining portion of the mirror for rearward viewing. Further, as shown in FIG. 2, the rearward field of view 60 of the optimized mirror is rotated outward, away from the vehicle 150 thus enabling the driver to view objects both to the rear of the vehicle and directly adjacent to the vehicle. For example, the object vehicle 500 located to the rear and adjacent to the vehicle 150 is visible in the rearward field of view 60. Accordingly, optimizing the position of the mirror 112 may be utilized to reduce blind spots, such as blind spot 70, while still providing the driver with a rearward frame of reference with respect to the driven vehicle 150.

While specific reference has been made herein to positioning the mirror 112 such that less than about 10% of the driven vehicle 150 is visible in the mirror, it will be understood that this value is exemplary and that other values may be used depending on the specific vehicle and size and positioning of the mirrors.

Referring now to FIG. 3, the system 100 for adjusting the position of an outside mirror of a vehicle generally comprises an electronic control unit (ECU) 102, a driver position detector 104, a mirror actuator 106 and at least one seat position detector 105. The ECU 102 may generally comprise a programmable logic controller or similar computer controller which is operable to execute a set of instructions programmed and/or stored in the ECU 102. As shown in FIG. 3, the driver location detector 104, the mirror actuator 106 and the at least on seat position detector 105 may be electrically coupled to the ECU 102 such that electrical signals may be propagated between each component and the ECU 102. Accordingly, while the arrows shown in FIG. 3 generally depict the interconnectivity of various components of the system 100, the arrows are also indicative of electrical signal propagated between a component and the ECU 102.

The driver position detector 104 may generally comprise a sensor or system operable to detect the location of a driver's head when the driver is seated in the driver's seat of the vehicle. In one embodiment, the driver position detector 104 may comprise one or more sensors positioned in the head rest of the driver's seat and operable to measure the capacitance between the head rest and the driver's head thereby determining the location of the driver's head with respect to the head rest. The sensors may send a signal to the ECU 102 indicative of the capacitance between the user's head and the head rest. In this embodiment, the ECU 102 may be operable to calculate the position of the driver's head relative to a fixed point inside the vehicle based on the measured capacitance and the measured position of the driver's seat (described further herein).

Figure 6:
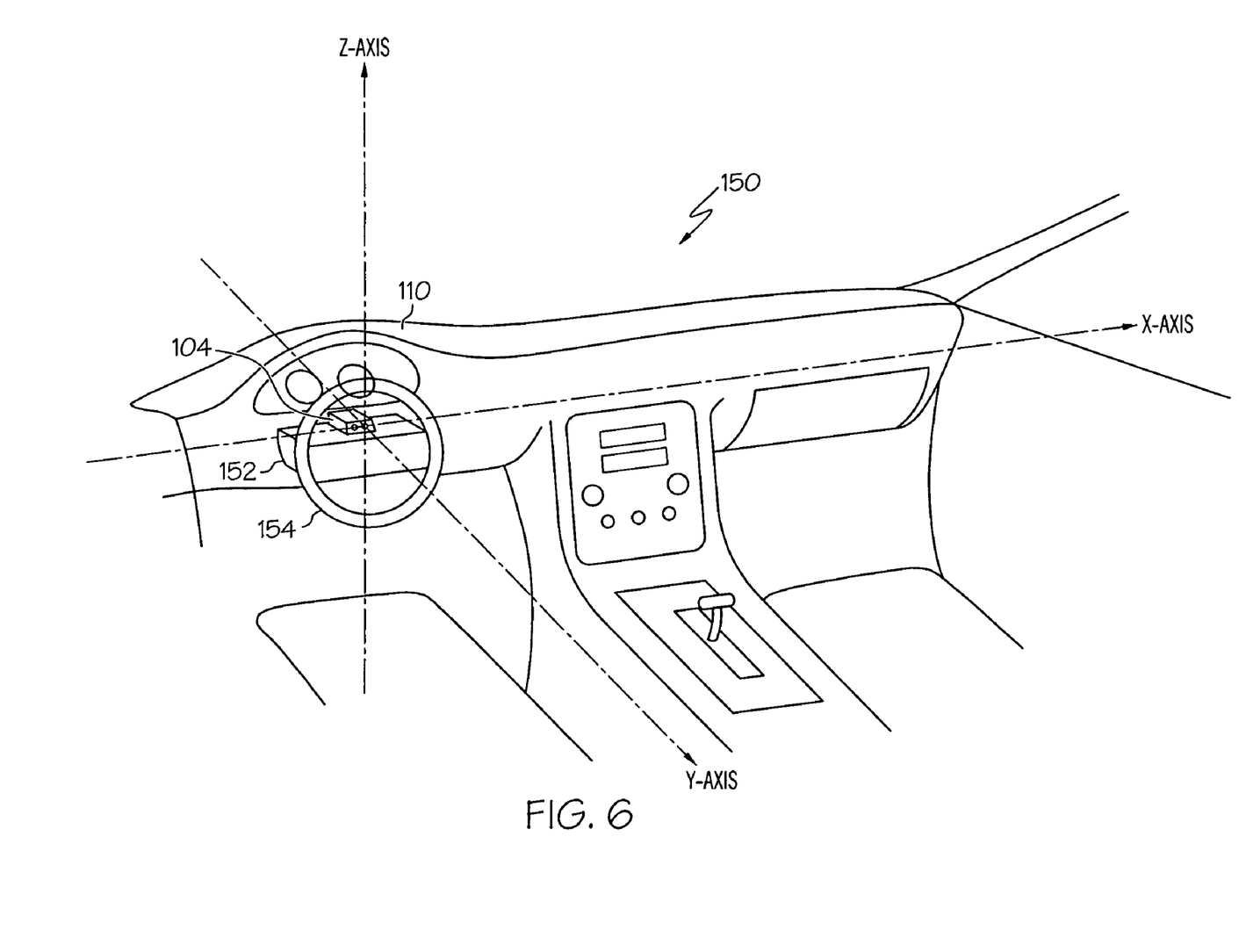
FIG. 6 is a schematic diagram of an interior of a vehicle depicting the location of a driver position detector according to one or more embodiments shown and described herein.

In another embodiment, the driver position detector 104 may comprise an optical system such as a stereo camera system or a mono camera system. The optical system may be mounted in front of the driver's seat, such as on the steering column (as shown in FIG. 6) or on the instrument panel 110. The camera systems may be used to detect the position of a driver's head relative to a fixed point on the interior of the vehicle by capturing images of the driver's head and face and using image analysis techniques to calculate the distance of the driver's head from the camera. The optical system outputs a signal indicative of the spatial coordinates of the driver's head and/or the driver's eyes to the ECU 102.

In another embodiment, the driver position detector 104 may comprise an optical system which may include one or more LEDs and a photo detector. The optical system may be mounted in front of the driver's seat, such as on the steering column (as shown in FIG. 6) or on the instrument panel 110. In one embodiment, the LEDs are used to project a light grid onto the driver's head and face. The photo detector may be used to capture the surface contours of the face which, in turn, may be used to determine the location of the driver's eyes as a reference point using image analysis techniques. In addition, the optical system may be used to determine the time interval between projecting the light grid and detecting the reflected light grid and thereby calculate the distance to the driver's head. The optical system may also be used to detect light reflected from the driver's retina (e.g., "red eye") and utilize this information to identify the location of the driver's eyes and, therefore, the position of the driver's head relative to the detection system. The optical system outputs a signal indicative of the spatial coordinates of the driver's head and/or the driver's eyes to the ECU 102.

In yet another embodiment, the driver position detector 104 may comprise an ultrasonic sensor comprising an ultrasonic transmitter and receiver. The ultrasonic sensor may be mounted in front of the driver's seat, such as on the steering column (as shown in FIG. 6) or on the instrument panel 110 in front of the driver's seat. The ultrasonic sensor may be operable to emit an ultrasonic signal in the direction of the driver and receive a reflected ultrasonic signal reflected from the driver. The ultrasonic sensor may be operable to calculate the distance to the driver's head based on the time interval between the emitted ultrasonic signal and the received reflected ultrasonic signal. The ultrasonic sensor may output a signal indicative of the spatial coordinates of the driver's head.

The mirror actuator 106 of the system 100 may comprise a plurality of electric motors, such as servo motors or the like, operatively coupled to the rear surface of the outside mirror. The mirror actuator 106 may be operable to rotate the mirror about a vertical axis thereby adjusting the angular orientation of the mirror with respect to the side of the vehicle (e.g., the outside mirror may be rotated outward, away from the side of the vehicle, and inward, towards the side of the vehicle). The mirror actuator 106 may also be operable to tilt the mirror about a substantially horizontal axis, thereby tilting the mirror up, in a direction towards the roof of the vehicle, or down, in a direction towards the ground.

As shown in FIG. 3, the system 100 may also comprise at least one seat position detector. In the embodiment shown in FIG. 3, the system 100 comprises a first seat position detector 105 operable to determine the position of the driver's seat relative to a fixed point on the interior of the vehicle. More specifically, the first seat position detector 105 is operable to determine the location of the seat along the length of the vehicle, from front to rear. The system 100 may also comprise a second seat position detector 107. The second seat position detector 107 is operable to detect the angular orientation of a seat-back portion of the driver's seat relative to the seat portion of the driver's seat such as when the seat-back portion of the driver's seat may be reclined relative to the seat portion. In another embodiment, the system 100 may further comprise a third seat position detector (not shown) operable to detect the height of the seat portion of the seat relative to the floor of the vehicle.

The seat position detectors 105, 107 may comprise photo sensors (not shown) operatively coupled to motors coupled to the seat and operable to adjust the seat in various directions according to user preferences and/or pre-programmed positions. The photo detectors may be operable to determine the number of revolutions of the motor required to move the seat to the desired position. Based on the number of revolutions and the known distance (or angle) the seat moves per revolution, the position of the seat or a specific portion of the seat may be determined relative to a fixed point on the interior of the vehicle.

The ECU 102 of the system 100 may be operable to adjust the angular orientation of the outside mirror with respect to the side of the vehicle and the tilt of the mirror by sending control signals to the mirror actuator 106. The ECU 102 may also be operable to determine an optimum angular orientation of the outside mirror so as to maximize the rearward view of the driver while providing a rearward frame of reference thereby reducing or mitigating blind spots based on electrical signals received from the seat position detectors 105, 107, and the driver position detector 104. Various methods for adjusting the angular orientation of the mirror and the tilt of the mirror will now be described with specific reference to FIGS. 3-10.

Referring now to FIGS. 3, 5 and 8-9, in one embodiment, the outside mirror of the vehicle may be adjusted based on the position of the driver's seat 300 and, more specifically, based on the position of the head rest portion 306 of the driver's seat 300. The location of the head rest portion 306 may be determined based on the position of the driver's seat 300 as determined by the first seat position detector 105 and the second seat position detector 107. Specifically, the first seat position detector 105 may send an electronic signal to the ECU 102 indicative of the position of the driver's seat 300 in the y-direction which may generally correspond to a distance $d_{sy}$ between the seat portion 304 of the driver's seat 300 and a fixed point on the interior of the vehicle. In the present example, the fixed point on the interior of the vehicle may be the origin of the (x, y, z) coordinate system which is positioned on the steering column 152 of the vehicle just behind the steering wheel 154 and generally corresponds to the location of the driver position detector. The second seat position detector 107 may send an electronic signal to the ECU 102 indicative of the angular orientation γ of the seat back portion 302 relative to the seat portion 304 of the driver's seat 300. In one embodiment, where the driver's seat 300 is height adjustable, a third seat position sensor (not shown) may send an electronic signal to the ECU 102 indicative of the height of the seat $d_{sz}$ in the z-direction relative to the floor of the vehicle.

Figure 5:
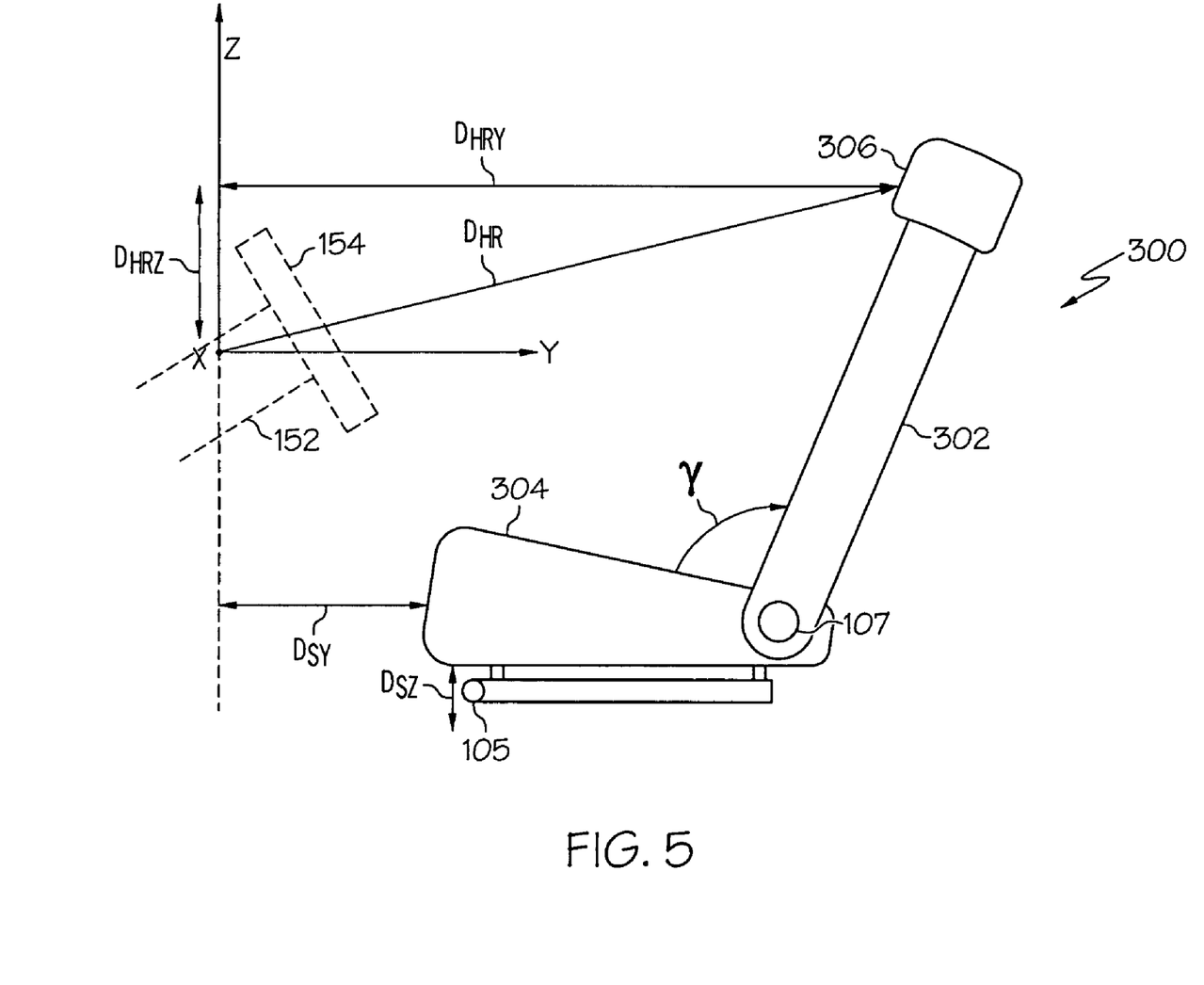
FIG. 5 is a schematic diagram of a driver's seat of a vehicle relative to the steering column and steering wheel of the vehicle according to one or more embodiments shown and described herein.

In one embodiment, after the ECU 102 receives the electronic signals from the seat position sensors, the ECU 102 may be programmed to calculate coordinates ($D_{HRx}$, $D_{HRy}$, $D_{HRz}$) of the head rest portion 306 of the driver's seat relative to the coordinate axes (x, y, z) based on the received electronic signals and the known dimensions of the driver's seat 300. It should be understood that the coordinates ($D_{HRx}$, $D_{HRy}$, $D_{HRz}$) of the head rest portion 306 may be generally indicative of the position of a driver's head when the driver is seated in the driver's seat 300 of the vehicle.

In another embodiment, after the ECU 102 receives the electronic signals from the seat position sensors, the ECU 102 may be programmed to determine the coordinates ($D_{HRx}$, $D_{HRy}$, $D_{HRz}$) based on a seat position look up table (LUT). For example, in one embodiment, the ECU 102 may contain a seat position LUT stored in a memory contained in or operatively associated with the ECU 102. The seat position LUT may contain a list of head rest position coordinates ($D_{HRx}$, $D_{HRy}$, $D_{HRz}$) indexed according to the position of the seat portion 304 in the y-direction ($d_{sy}$) and the angle γ of the seat back portion 302 relative to the seat portion 304. Alternatively, where the driver's seat 300 is also height adjustable, the seat position LUT may be indexed according to the position of the seat portion 304 of the driver's seat in the y-direction ($d_{sy}$), the angular orientation γ of the seat back 302 relative to the seat portion 304 and the height $d_{sz}$ of the seat in the z-direction.

In either embodiment, after the ECU 102 determines the coordinates ($D_{HRx}$, $D_{HRy}$, $D_{HRz}$) of the head rest portion 306 of the driver's seat 300, the coordinates may be stored in a memory of the ECU for subsequent use in adjusting the angular orientation and tilt of an outside mirror of the vehicle, as will be described in more detail herein.

Figure 7:
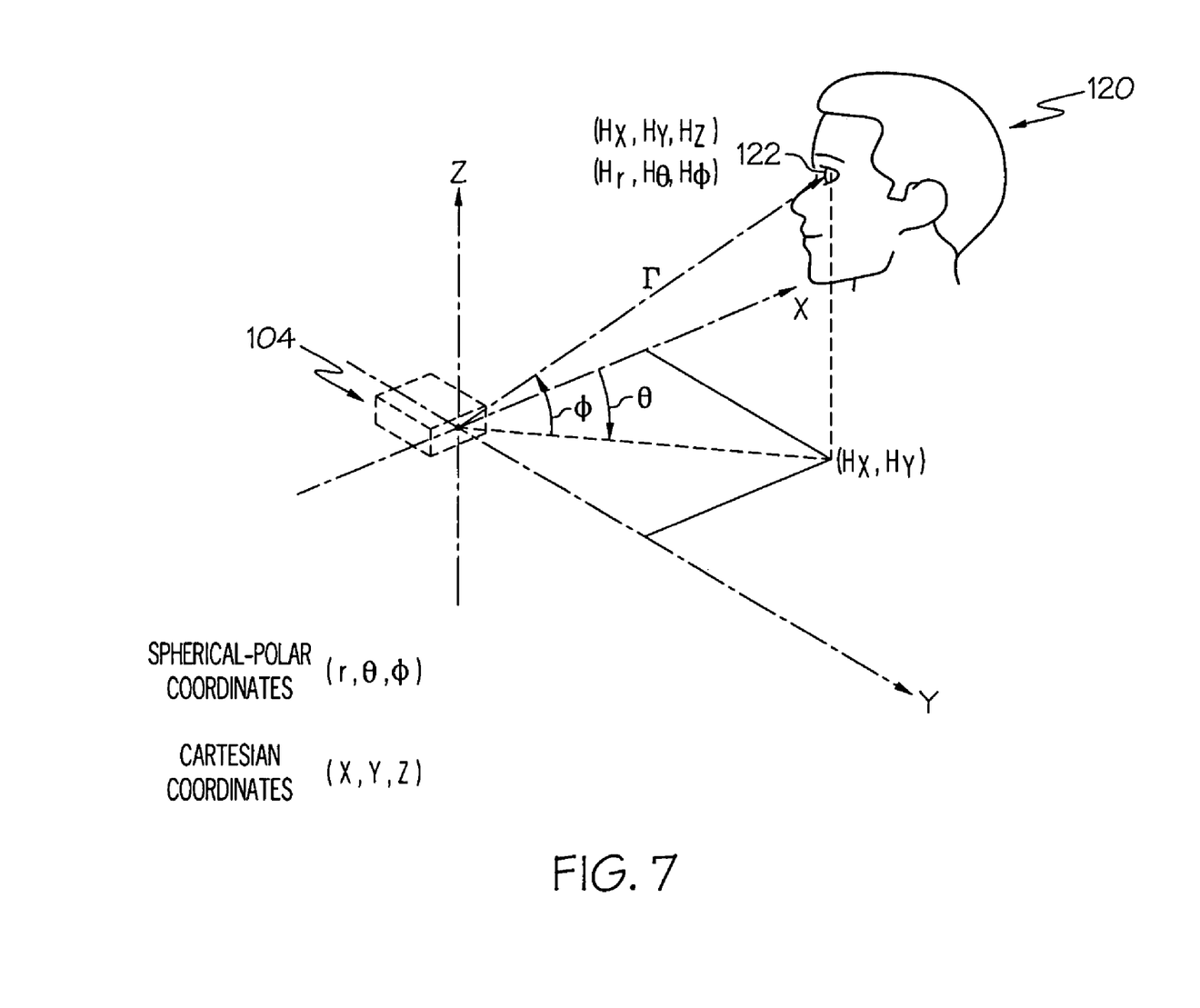
FIG. 7 is a schematic diagram showing the coordinate axes (x, y, z) used to determine the location of a driver's head with a driver position detector according to one or more embodiments shown and described herein.

Referring now to FIGS. 3 and 7, in another embodiment, the outside mirror of the vehicle may be adjusted based on the location of the driver's head 120 in the interior of the vehicle, as determined by the driver position detector 104. For example, when the driver position detector 104 is a stereo camera positioned on the steering column 152 of the vehicle 150, as described above, the stereo camera may capture multiple images of the driver's head 120 and, through image analysis techniques, determine the location of the driver's head 120 relative to the interior (x, y, z) coordinate system on the interior of the vehicle. More specifically, the driver position detector 104 may be operable to determine the location of the driver's eyes, and based on this location, determine the distance from the origin of the (x, y, z) coordinate system to that specific point.

For example, in one embodiment, based on a determined location of the driver's eyes, the driver position detector 104 may be operable to determine a vector r which extends from the origin of the (x, y, z) coordinate system to a point 122 between the driver's eyes. Based on the relationship of the vector r to the coordinate system (e.g., the angle φ between a component of the vector r in the xy plane and the x-axis and the angle φ between the xy plane and the vector r), the location of the point 122 may be determined relative to the origin of the (x, y, z) coordinate system in spherical polar coordinates ($H_r$, $H_θ$, $H_φ$) where $H_r$ is the distance to the point 122 from the origin, $H_θ$ is the angle between a component of the vector r in the xy plane and the x-axis, and $H_φ$ is an angle between the xy plane and the vector r.

Alternatively, the driver position detector 104 may be operable to determine a vector r which extends from the origin of the (x, y, z) coordinate system to a point 122. The vector r has a component $H_x$ along the direction of the x-axis, a component $H_y$ along the direction of the y-axis, and a component $H_z$ along the direction of the z-axis such that the point 122 on the driver's head 120 has coordinates ($H_x$, $H_y$, $H_z$) relative to the origin of the (x, y, z) coordinate system.

The driver position detector 104 may be operable to output an electronic signal to the ECU 102 indicative of the coordinates of the point 122 on the driver's head 120 in either spherical polar coordinates (e.g., ($H_r$, $H_θ$, $H_φ$)) or rectangular (e.g., ($H_x$, $H_y$, $H_z$)) coordinates. The ECU 102 may store the coordinates indicative of the position of the driver's head in a memory operatively associated with the ECU 102 for subsequent use in adjusting the position of the outside mirror of the vehicle as will be described in more detail herein.

Figure 8:
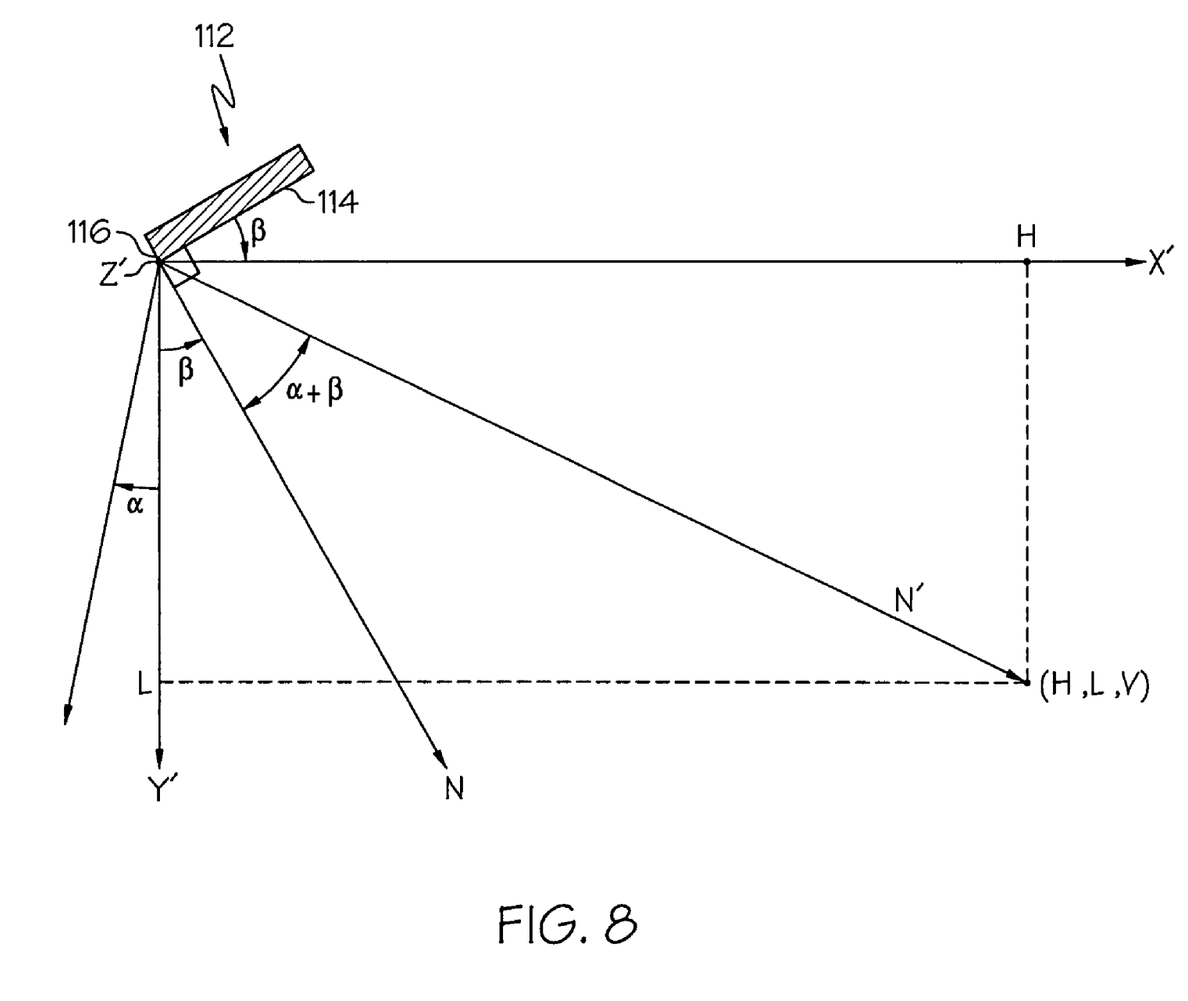
FIG. 8 is a schematic diagram showing the coordinate axes (x', y', z') used to adjust the angle of the outside mirror of the vehicle relative to the vehicle.
Figure 9:
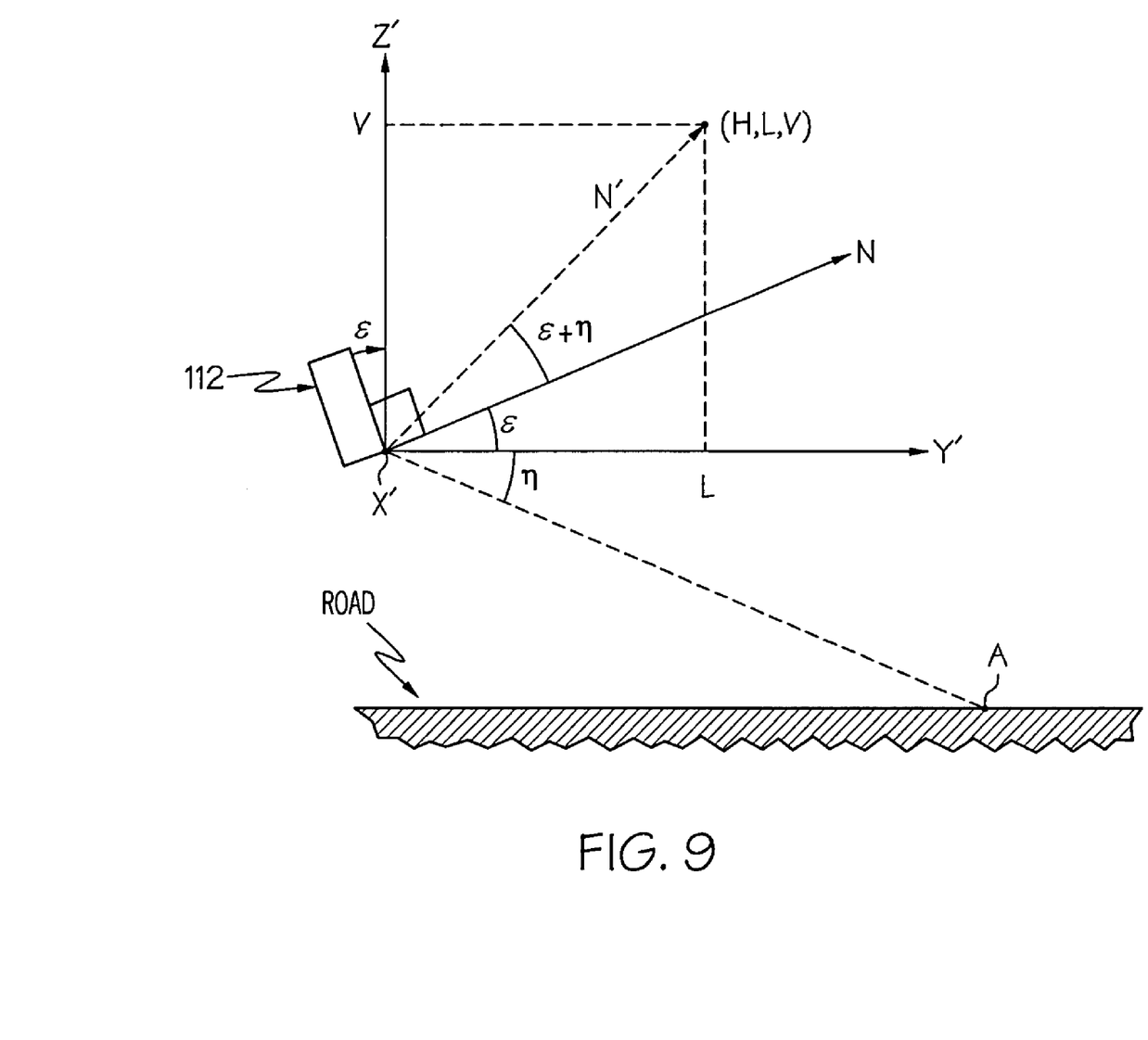
FIG. 9 is a schematic diagram showing the coordinate axes (x', y', z') used to adjust the tilt of the mirror.

Referring now to FIGS. 8-9, after the coordinates ($D_{HRx}$, $D_{HRy}$, $D_{HRz}$) of the head rest portion 306 of the driver's seat 300 have been determined or, alternatively, the coordinates ($H_r$, $H_θ$, $H_φ$) or ($H_x$, $H_y$, $H_z$) of a point on the driver's head have been determined, the coordinates may be transformed to coordinates in the (x', y', z') coordinate system having an origin on the surface 114 of the mirror 112. More specifically, the coordinates may be transformed into (H, L, V) coordinates where H is the distance of the head rest or driver's head from the origin of the (x', y', z') coordinate system in the x' direction, L is the distance of the head rest or driver's head from the origin of the (x', y', z') coordinate system in the y' direction and V is the distance of the head rest or driver's head from the origin of the (x', y', z') coordinate system in the z' direction as illustrated in FIGS. 8-9. The transformation of the coordinates from the (x, y, z) coordinate system on the interior of the vehicle to the (x', y', z') coordinates of the mirror 112 may be performed by the ECU 102 based on the known relative orientation between the origin of the (x, y, z) coordinate system and the origin of the (x', y', z') coordinate system, as will be apparent to one skilled in the art.

Figure 10:
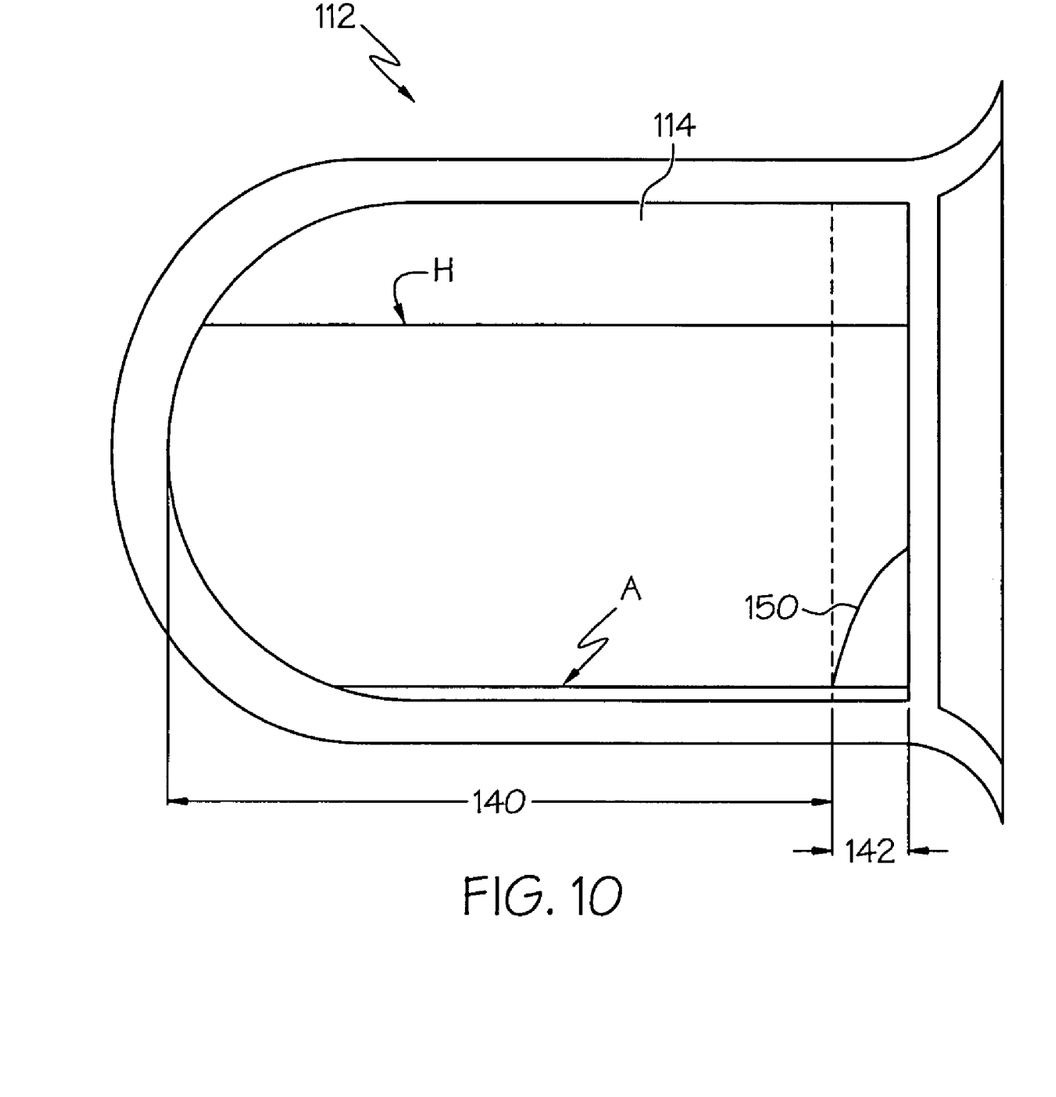
FIG. 10 depicts an outside mirror of a vehicle adjusted such that the rear of the vehicle is visible to the driver in at least a portion of the outside mirror.

Referring now to FIGS. 8-10, after the coordinates indicative of the position of the driver's seat head rest or the driver's head have been transformed to the (x', y', z') coordinate system, the ECU 102 may determine the optimal angular orientation of the outside mirror 112 about the z'-axis based on the location of the head rest portion 306 of the driver's seat 300 or the position of a point 122 on the driver's head 120. When the outside mirror 112 is in the optimal angular orientation, the rear of the vehicle 150 will be visible to the driver in at least a portion 142 of the surface 114 of the mirror 112, as shown in FIG. 10. In this orientation, blind spots are minimized and the driver has as clear frame of reference in the outside mirror with respect to the rear of the vehicle 150. In one embodiment, the portion 142 in which the rear of the vehicle 150 is visible is less than about 10% of the total width of the surface 114, where the total width of the mirror is indicated by line segments 140 and 142. In another embodiment, the portion 142 of the mirror 112 in which the rear of the vehicle is visible is less than about 5%. However, it should be understood that the exact percentage of the portion 142 may vary from vehicle to vehicle depending on such things as the dimensions of the mirror and the overall dimensions of the vehicle.

Referring now to FIG. 8, for a given location of the head rest portion 306 of the driver's seat 300 (or driver's head), the distance from the origin of the (x', y', z') coordinate system in the x'y' plane may be indicated by the vector N' having a component L along the y'-axis and a component H along the x'-axis. FIG. 8 also shows the adjusted position of the mirror 112 to mitigate blind spots to the rear of the vehicle. Specifically, the angle α relative to the y'-axis is a known maximum angle with which the outside mirror 112 should be positioned to eliminate blind spots to the rear of the vehicle and the angle β is the angle between the y'-axis and the normal N to the surface 114 of the mirror 112.

Based on this geometrical relationship, the angle β is also equal to the mirror rotation angle about the z'-axis with respect to the x'-axis, and, as such, is the angle through which the mirror is rotated in order to mitigate blind spots to the rear of the vehicle. Because the angle of incidence is equal to the angle of reflection for a plane or flat mirror, the angle between the normal N to the surface 114 of the mirror 112 and the vector N' is α+β.

In one embodiment, the angle β may be calculated by the ECU 102 based on the geometrical relationship of the head-rest portion 306 or the driver's head 120 relative to the (x', y', z') coordinate system. In this embodiment, the angle β may be calculated according to the following equation:

$$\beta = \frac{\tan^{-1}\left(\frac{H}{L}\right) - \alpha}{2},$$

where H, L and α are as defined hereinabove.

In another embodiment, the ECU 102 may determine the angle β from a mirror angle look up table (LUT). For example, the ECU may contain a mirror angle LUT stored in a memory contained in or operatively associated with the ECU 102. The mirror angle LUT may comprise various values for the angle β indexed according to the position H of the head rest along the x' axis and the position L of the head rest along the y' axis. Accordingly, where the angle α is a constant for a particular outside mirror, the angle β may be determined from the mirror angle LUT based on the coordinates H and L, which may be determined from the position of the driver's seat 300 as described hereinabove.

Once the angle β is determined, the ECU 102 may be programmed to rotate the mirror 112 through the angle β with respect to the x'-axis by sending a control signal to the mirror actuator 106 which causes the mirror 112 to rotate about the z-axis to the position shown in FIG. 8. In this orientation, the position of the mirror is optimized such that blind spots are minimized, as shown in FIGS. 2 and 10.

Referring now to FIGS. 9 and 10, for a given location of the head rest portion 306 of the driver's seat 300 (or driver's head), the distance from the origin of the (x', y', z') coordinate system in the y'z' plane may be indicated by the vector N' having a component L along the y'-axis and a component V along the z'-axis. FIGS. 9 and 10 show the position of the mirror 112 such that the ground (e.g., line "A") and the horizon (e.g., line "H") are visible in the mirror 112. Line A, as used herein, is the closest ground line visible in the mirror. The angle η relative to the y'-axis is a known angle with which the mirror 112 should be positioned such that both the horizon and the line A are visible in the mirror 112. The angle ε is the angle between the y'-axis and the normal N to the surface 114 of the mirror 112. From this geometry, the angle ε is also equal to the mirror tilt rotation angle with respect to the z'-axis, and, as such, is the angle the mirror should be tilted such that both line A and the horizon are visible in the mirror. Because the angle of incidence is equal to the angle of reflection for a plane or flat mirror, the angle between the normal N to the surface 114 of the mirror 112 and the vector N' is η+ε.

In one embodiment, the angle ε may be calculated by the ECU 102 based on the geometrical relationship between the position of the head rest portion 306 or driver's head 120 relative to the origin of the (x', y', z') coordinate axis. In this embodiment, the angle ε may be calculated according to the equation $$\varepsilon = \frac{\tan^{-1}\left(\frac{V}{L}\right) - \eta}{2}$$

where L, V and η are as described hereinabove.

In another embodiment, the ECU 102 may determine the angle ε from a tilt angle look up table (LUT). For example, the ECU may contain a tilt angle LUT stored in a memory contained in or operatively associated with the ECU 102. The tilt angle LUT may comprise various values for the angle ε indexed according to the position L of the head rest or driver's head along the y'-axis and the position V of the head rest or driver's head along the Z'-axis. Accordingly, the angle ε may be determined from the tilt angle LUT based on the coordinates L and V, which may be determined from the position of the driver's seat 300 or driver's head 120 as described hereinabove.

Once the angle ε is determined, the ECU 102 may be programmed to rotate the mirror 112 through an angle ε with respect to the z'-axis by sending a control signal to the mirror actuator 106 which causes the mirror 112 to rotate to the position drawn in FIG. 9. In this orientation, the position of the mirror is optimized to such that the horizon and the line A appear in the mirror as shown in FIG. 10.

While two alternative methods for adjusting the position of the outside mirror are discussed herein (e.g., adjusting based on the driver's seat position and adjusting based on the location of the driver's head), it should be understood that the methods may be utilized together to adjust the position of the outside mirror such that blind spots are substantially mitigated or eliminated. For example, the mirror may be initially adjusted based on the position of the driver's seat to roughly orient the outside mirror such that blind spots are mitigated and the driver is provided with a rear view frame of reference with respect to the vehicle. Thereafter, the outside mirror may be readjusted based on the position of the driver's head to more precisely orient the outside mirror to the specific proportions or characteristics of the driver.

Figure 4:
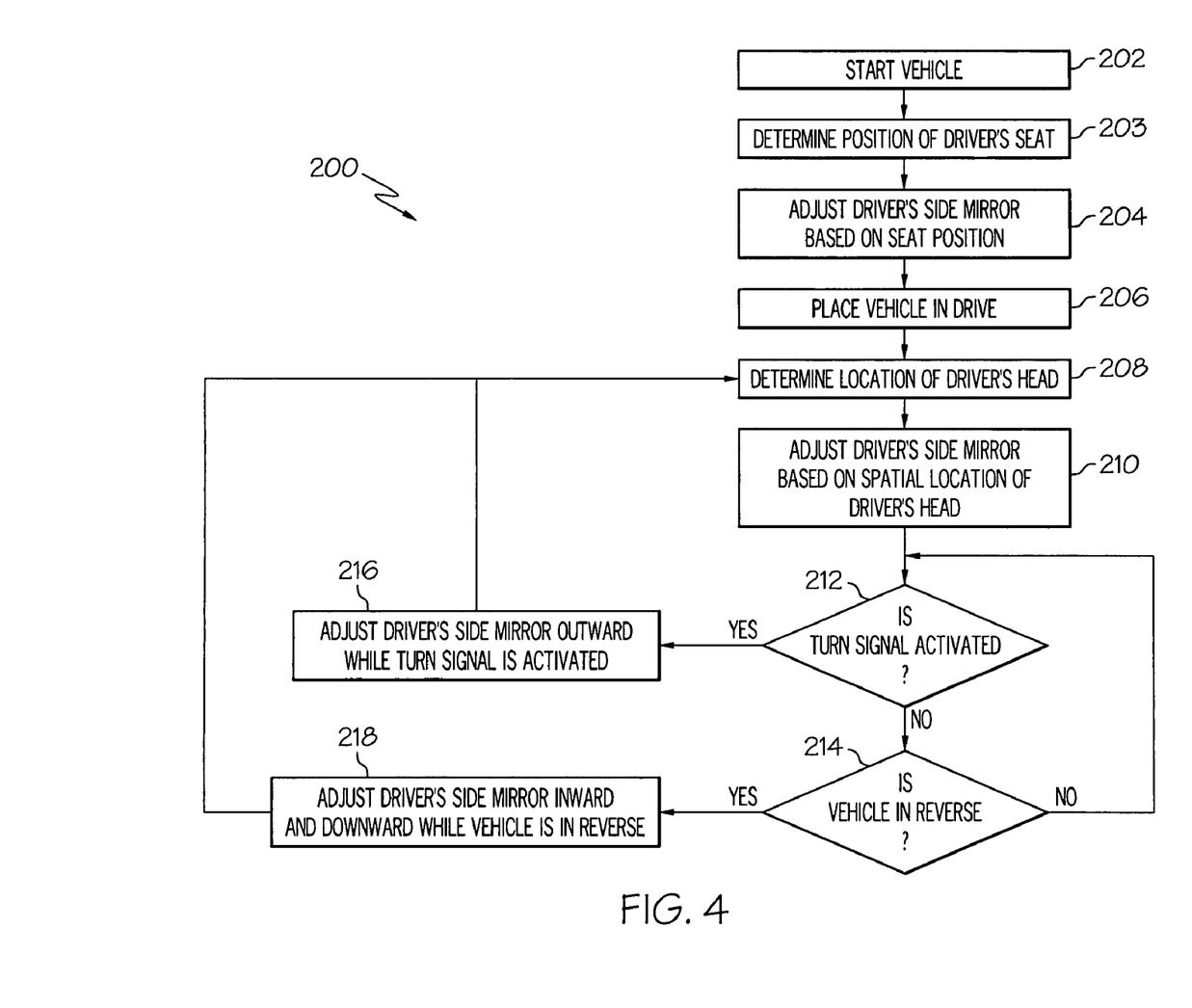
FIG. 4 is a flow diagram of one method for adjusting the position of a vehicle outside mirror according to one or more embodiments shown and described herein.

Referring now to FIG. 4, a flow diagram is shown of one embodiment of a method 200 for adjusting the position of an outside vehicle mirror 112 using both the position of the driver's seat and the location of the driver's head. The various steps of the method outlined in the flow diagram may be performed by the ECU 102 in conjunction with the seat position detectors 105, 107, driver position detector 104 and mirror actuator 106. In step 202 the vehicle is started by the driver. In step 203, the position of the driver's seat 300 is determined utilizing seat position sensors, as described hereinabove, which output signals to the ECU 102. The position of the driver's seat 300 may be used to generally approximate the location of the driver's head when a driver is positioned in the driver's seat 300. In one embodiment, the position of the driver's seat 300 (and therefore an approximation of the location of the driver's head) is determined by determining the position of the head rest portion 306 of the driver's seat 300 relative to a fixed point on the interior of the vehicle, as described herein. However, it should be understood that the position of other portions of the driver's seat 300 may be used to approximate the position of the driver's head relative to a fixed point on the interior of the vehicle.

In step 204, the driver's side mirror is adjusted based on the determined position of the driver's seat. More specifically, the angular orientation of the driver's side outside mirror about a substantially vertical axis (e.g., the z'-axis) is adjusted based on the determined positioned of the driver's seat. The angular orientation of the outside mirror is adjusted such that the rear of the vehicle is visible in at least a portion of the outside mirror, as described hereinabove. In one embodiment, adjusting the position of the outside mirror may also include adjusting the tilt of the mirror about a horizontal axis based on the determined position of the driver's seat. In order to adjust the angular orientation of the outside mirror, the ECU 102 may send a control signal to the outside mirror which causes the mirror to move to a predetermined or calculated location based on the determined position of the driver's seat such that blind spots are mitigated or reduced.

In a next step 206, the driver may place the vehicle in drive. Thereafter, in step 208, the location of the driver's head 120 may be determined with the driver position detector 104. In one embodiment, the step of determining the location of the driver's head 120 may occur at a predetermined time interval after the vehicle has been placed in drive in order to allow the driver to settle into the routine of driving and thereby establish what amounts to a "default" head position. In step 208 the driver's head position may be determined utilizing an optical system or a capacitive system, as described above. The driver position detector 104 sends an electronic signal to the ECU 102 indicative of the coordinates of the driver's head. The coordinates indicative of the driver's head may include the coordinates of the driver's face, the coordinates of the driver's eyes, the coordinates of a specific point on the driver's head or various combinations thereof.

In step 210 the driver's side mirror is adjusted based on the determined location of the driver's head 120. More specifically, the angular orientation of the driver's side outside mirror about a substantially vertical axis (e.g., the z'-axis) is adjusted based on the determined location of the driver's head. The angular orientation of the outside mirror is adjusted such that blind spots are mitigated or reduced. In one embodiment, adjusting the position of the outside mirror may also include adjusting the tilt of the mirror about a horizontal axis based on the determined position of the driver's head. In order to adjust the angular orientation of the outside mirror, the ECU 102 may send a control signal to the outside mirror which causes the mirror to move to a predetermined or calculated location based on the determined position of the driver's head such that blind spots are mitigated or reduced.

In one embodiment of the method (not shown), the steps of determining the location of the driver's head and readjusting the driver's side mirror based on the location of the driver's head are periodically repeated while the vehicle is in drive. This allows for the position (e.g., the angular orientation and/or tilt) of the mirror to be periodically updated based on any changes in the driver's position or posture while driving. This may be especially important when the driver is seated in the vehicle for an extended period of time as the driver may periodically adjust his or her position to maximize comfort while driving. However, the steps of determining the location of the driver's head and readjusting the driver's side mirror based on the location of the driver's head are not repeated so frequently so as to create a distraction to the driver.

In another embodiment, the method 200 may further comprise adjusting the outside mirror when the turn signal of the mirror is activated or when the vehicle is placed in reverse, as shown in FIG. 4. For example, in step 212, the ECU may determine if a turn signal of the vehicle is activated. In step 216, if the turn signal is activated, the ECU 102 may be programmed to adjust the position of the outside mirror with the mirror actuator 106 by sending a control signal to the mirror actuator 106 which causes the outside mirror to rotate outward, away from the vehicle, thereby providing the driver with an increased rearward field of view and assisting the driver in determining if traffic is approaching from the rear of the vehicle as the driver executes a lane change or other maneuver. When the mirror is rotated outward, the rear of the vehicle may not be visible in a portion of the mirror. However, after the driver has made the turn (e.g., when the turn signal is no longer activated) the method 200 may return to step 208 where the steps of determining the location of the driver's head and adjusting the outside driver's side mirror are repeated thereby restoring the outside mirror to an angular orientation where blind spots are mitigated or reduced.

When a turn signal of the vehicle is not activated, the ECU 102 may then determine if the vehicle is in reverse in step 214. If the vehicle is not in reverse, the method loops back to step 212. In step 218, if the vehicle is in reverse, the ECU 102 may be programmed to adjust a position of the outside mirror by sending a control signal to the mirror actuator 106 which causes the mirror actuator 106 to rotate the outside mirror inwards, toward the vehicle, and downwards, thereby providing the driver with a more complete view of the side of the vehicle and any obstacles that may be located directly adjacent the vehicle when reversing. When the mirror is rotated inward, the driver's rearward field of view in the mirror may be limited as blind spots are created (e.g., the driver may be unable to see obstacles in an adjacent lane and to the rear of the vehicle). However, after the driver has finished reversing (e.g., when the vehicle is no longer in reverse) the method 200 may return to step 208 where the steps of determining the location of the driver's head and adjusting the outside driver's side mirror are repeated thereby restoring the outside mirror to an angular orientation where blind spots are mitigated or reduced.

It should now be understood that the methods and systems shown and described herein may be used in conjunction with an outside mirror of a vehicle to adjust the angular orientation and tilt of the outside mirror such that blind spots are reduced or mitigated and the rear of the vehicle is visible in at least a portion of the outside mirror thereby providing the driver with a rearward frame of reference while maximizing the driver's rearward field of view.

While the systems and methods for adjusting the angular orientation and tilt of a mirror are shown and described with reference to a driver's side outside mirror, it should be understood that the systems and methods may also be used to adjust the angular orientation and tilt of a passenger's side outside mirror. Further, the systems and methods shown and described herein may be used with mirrors having flat glass or mirrors having convex glass.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A method for adjusting an outside mirror of a vehicle comprising:

providing at least one seat position sensor, a driver position detector and a mirror actuator;

determining a position of the driver's seat with the at least one seat position sensor;

adjusting an angular orientation of the outside mirror with the mirror actuator based on the determined position of the driver's seat such that a rear of the vehicle is visible in at least a portion of the outside mirror;

detecting a location of a driver's head with the driver position detector when the driver is seated in the driver's seat; and readjusting the angular orientation of the outside mirror with the mirror actuator based on the detected position of the driver's head such that a rear of the vehicle is visible to the driver in at least a portion of the outside mirror when the driver is seated in the driver's seat.

2. The method of claim 1 wherein the position of the driver's seat is determined when the vehicle is started.

3. The method of claim 1 wherein the location of the driver's head is detected after the vehicle is placed in drive.

4. The method of claim 1 wherein the angular orientation of the mirror is adjusted and readjusted such that a rear of the vehicle is visible to the driver in less than about 10% of the outside mirror.

5. The method of claim 1 wherein the driver position detector comprises an optical system and the location of the driver's head is determined by locating the eyes of the driver with the optical system.

6. The method of claim 1 further comprising adjusting a tilt of the outside mirror with the mirror actuator based on the determined position of the driver's seat.

7. The method of claim 1 further comprising adjusting a tilt of the outside mirror with the mirror actuator based on the detected location of the driver's head.

8. The method of claim 1 wherein the at least one seat position sensor comprises a first seat position sensor operable to detect a distance of a seat portion of the driver's seat relative to a fixed point and a second position sensor operable to detect an angle between the seat portion of the driver's seat and a seat back portion of the driver's seat; and
the position of the seat is determined by detecting the distance of the seat portion of the driver's seat relative to a fixed point, detecting the angle between the seat portion and the seat back portion and determining a position of a head rest portion of the driver's seat relative to the fixed point based on the detected distance and the detected angle.

9. The method of claim 1 wherein the at least one seat position sensor comprises a first seat position sensor operable to detect a distance of a seat portion of the driver's seat relative to a fixed point, a second position sensor operable to detect an angle between the seat portion of the driver's seat and a seat back portion of the driver's seat and a third seat position sensor operable to detect a height of the seat relative to a floor of the vehicle; and
the position of the seat is determined by detecting the distance of the seat portion of the driver's seat relative to a fixed point, detecting the angle between the seat portion and the seat back portion, detecting a height of the seat and determining a position of a head rest portion of the driver's seat relative to a fixed point based on the detected distance, the detected angle and the detected height.

10. A method for adjusting an outside mirror of a vehicle comprising:
providing at least one seat position sensor, a driver position detector and a mirror actuator;
determining a position of the driver's seat with the at least one seat position sensor;
adjusting an angular orientation of the outside mirror with the mirror actuator based on the determined position of the driver's seat such that a rear of the vehicle is visible in at least a portion of the outside mirror;
detecting a location of a driver's head with the driver position detector when the driver is seated in the driver's seat;
readjusting the angular orientation of the outside mirror with the mirror actuator based on the detected position of the driver's head such that a rear of the vehicle is visible to the driver in at least a portion of the outside mirror when the driver is seated in the driver's seat;
rotating the mirror away from the vehicle when a turn signal of the vehicle is actuated; and
rotating the mirror toward the vehicle and downward when the vehicle is reversing.

11. The method of claim 10 wherein the driver's position sensor comprises an optical system and the location of the driver's head is determined by locating the eyes of the driver with the optical system.

12. The method of claim 10 further comprising adjusting a tilt of the outside mirror with the mirror actuator based on the determined position of the driver's seat.

13. The method of claim 10 further comprising adjusting a tilt of the outside mirror with the mirror actuator based on the determined location of the driver's head.

14. The method of claim 10 wherein the at least one seat position sensor comprises a first seat position sensor operable to detect a distance of a seat portion of the driver's seat relative to a fixed point and a second position sensor operable to detect an angle between the seat portion of the driver's seat and a seat back portion of the driver's seat; and
the position of the seat is determined by detecting the distance of the seat portion of the driver's seat relative to a fixed point, detecting the angle between the seat portion and the seat back portion and determining a position of a head rest portion of the driver's seat relative to the fixed point based on the detected distance and the detected angle.

15. The method of claim 10 wherein the at least one seat position sensor comprises a first seat position sensor operable to detect a distance of a seat portion of the driver's seat relative to a fixed point, a second position sensor operable to detect an angle between the seat portion of the driver's seat and a seat back portion of the driver's seat and a third seat position sensor operable to detect a height of the seat relative to a floor of the vehicle; and
the position of the seat is determined by detecting the distance of the seat portion of the driver's seat relative to a fixed point, detecting the angle between the seat portion and the seat back portion, detecting a height of the seat and determining a position of a head rest portion of the driver's seat relative to a fixed point based on the detected distance, the detected angle and the detected height.

16. A system for adjusting a position of an outside mirror of a vehicle comprising an electronic control unit operatively coupled to a mirror actuator, at least one seat position sensor operatively coupled to a driver's seat and the electronic control unit, a driver position detector operatively coupled to the electronic control unit and a mirror actuator mechanically coupled to the outside mirror and the electronic control unit, wherein:
the at least one seat position sensor is operable to send a first electronic signal to the electronic control unit indicative of a position of the driver's seat at vehicle start-up;
the electronic control unit is programmed to receive the first electronic signal indicative of the position of the driver's seat at vehicle start-up and adjust an angular orientation of the outside mirror based on the received first electronic signal by sending a first control signal to the mirror actuator, wherein the first control signal sent to the mirror actuator positions the mirror such that the rear of the vehicle is visible in at least a portion of the outside mirror;
the driver position detector is operable to detect a location of the driver's head while the vehicle is in drive and send a second electronic signal to the electronic control unit indicative of the detected location of the driver's head; and the electronic control unit is further programmed to receive the second electronic signal indicative of the location of the driver's head and readjust the angular orientation of the outside mirror based on the received second electronic signal by sending a second control signal to the mirror actuator, wherein the second control signal sent to the mirror actuator positions the mirror such that the rear of the vehicle is visible in at least a portion of the outside mirror.

17. The system of claim 16 wherein the electronic control unit is further programmed to rotate the outside mirror away from the vehicle when a turn signal of the vehicle is activated and rotate the outside mirror towards the vehicle when the vehicle is placed in reverse.

18. The system of claim 16 wherein the electronic control unit is programmed to adjust and readjust the position of the outside mirror such that the rear of the vehicle is visible in less than about 10% of the mirror.

19. The system of claim 16 wherein the electronic control unit is further programmed to adjust the tilt of the outside mirror based on the first received electronic signal and readjust the tilt of the outside mirror based on the second received electronic signal.

20. The system of claim 16 wherein the at least one seat position sensor comprises a first seat position sensor operable to detect a distance of a seat portion of the driver's seat relative to a fixed point and a second position sensor operable to detect an angle between the seat portion of the driver's seat and a seat back portion of the driver's seat and a third seat position sensor operable to detect a height of the seat relative to a floor of the vehicle.

* * * * *